US007698312B2

(12) United States Patent
Cruanes et al.

(10) Patent No.: US 7,698,312 B2
(45) Date of Patent: *Apr. 13, 2010

(54) PERFORMING RECURSIVE DATABASE OPERATIONS

(75) Inventors: Thierry Cruanes, Redwood City, CA (US); Wei Li, San Carlos, CA (US); Ari Mozes, Lexington, MA (US); Benoit Dageville, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 11/600,272

(22) Filed: Nov. 14, 2006

(65) Prior Publication Data

US 2007/0067327 A1 Mar. 22, 2007

Related U.S. Application Data

(63) Continuation of application No. 10/867,923, filed on Jun. 14, 2004, now Pat. No. 7,155,446.

(60) Provisional application No. 60/571,441, filed on May 14, 2004.

(51) Int. Cl.
*G06F 7/00* (2006.01)

(52) U.S. Cl. ..................................... 707/603

(58) Field of Classification Search ....................... None
See application file for complete search history.

(56) References Cited

U.S. PATENT DOCUMENTS

| 5,259,066 | A |   | 11/1993 | Schmidt et al. |          |
|-----------|---|---|---------|----------------|----------|
| 5,615,341 | A | * | 3/1997  | Agrawal et al. | 705/10   |
| 5,724,573 | A | * | 3/1998  | Agrawal et al. | 707/6    |
| 5,794,209 | A |   | 8/1998  | Agrawal et al. |          |
| 5,842,200 | A | * | 11/1998 | Agrawal et al. | 707/1    |
| 6,049,797 | A |   | 4/2000  | Guha et al.    |          |
| 6,061,682 | A | * | 5/2000  | Agrawal et al. | 707/6    |
| 6,138,117 | A |   | 10/2000 | Bayardo        |          |
| 6,324,533 | B1| * | 11/2001 | Agrawal et al. | 707/3    |

(Continued)

OTHER PUBLICATIONS

"The Authoritative Dictionary of IEEE Standards Terms Seventh Edition," IEEE Press, 2000.*

(Continued)

*Primary Examiner*—Tim T. Vo
*Assistant Examiner*—Aaron Sanders
(74) *Attorney, Agent, or Firm*—Hickman Palermo Truong & Becker LLP

(57) ABSTRACT

A method and apparatus for performing recursive database operations is provided. According to one aspect, a plurality of first-stage slaves and a plurality of second-stage slaves are established in a database server. During one or more iterations of a recursive database operation, the first-stage slaves concurrently process data items stored in a data repository and send results to the second-stage slaves. The second-stage slaves receive the results and concurrently process those results. The second-stage slaves store the results of the second-stage slaves' processing in the data repository. Subsequent iterations of the recursive database operation proceed in this manner until the recursive database operation has been completed. In each iteration, the first-stage slaves consume the product of the second-stage slaves' previous iteration's processing, and the second-stage slaves consume the product of the first-stage slaves' current iteration's processing.

28 Claims, 3 Drawing Sheets

U.S. PATENT DOCUMENTS

| | | | |
|---|---|---|---|
| 6,415,287 B1 | 7/2002 | Wang et al. |
| 6,453,404 B1 | 9/2002 | Bereznyi et al. |
| 6,473,757 B1 | 10/2002 | Garofalakis et al. |
| 6,490,582 B1 | 12/2002 | Fayyad et al. |
| 6,507,843 B1 | 1/2003 | Dong et al. |
| 6,567,936 B1 | 5/2003 | Yang et al. |
| 6,665,669 B2 | 12/2003 | Han et al. |
| 6,760,718 B2 | 7/2004 | Tamura |
| 6,968,335 B2 | 11/2005 | Bayliss et al. |
| 2002/0073019 A1 | 6/2002 | Deaton |
| 2002/0116457 A1 | 8/2002 | Eshleman et al. |
| 2004/0225742 A1 | 11/2004 | Loaiza et al. |
| 2005/0044062 A1 | 2/2005 | Li et al. |
| 2005/0044087 A1 | 2/2005 | Li et al. |
| 2005/0044094 A1 | 2/2005 | Li et al. |
| 2005/0149540 A1 | 7/2005 | Chan et al. |

OTHER PUBLICATIONS

Written Opinion from PCT Patent Application No. PCT/US02/06981 dated Oct. 3, 2004(8 pgs.).

Current Claims in PCT Patent Application No. PCT/US02/06981 (8 pgs.).

Office Action from Canadian Patent Application No. 2,448,050 dated Oct. 1, 2004 (2 pgs).

Current Claims in Canadian Patent Application No. 2, 448,050 (48 pgs).

Oracle Corporation, "Oracle® Data Mining, Concepts," 10g Release 1 (10.1), Part No. B10698-01, Dec. 2003, 118 pages.

Office Action from European Patent Application No. 01968979.3-2212, dated Aug. 6, 2004 (3 pgs.).

Current Claims in European Patent Application No. 01968979.3-2212 (3 pgs).

Wei, Li et al., "Computing Frequent Itemsets Inside Oracle 10G," Proceedings of the 30th VLDB Conference, Toronto, Canada, Aug. 29, 2004, 4 pages.

\* cited by examiner

PERFORMING RECURSIVE DATABASE OPERATIONS

CROSS-REFERENCE TO RELATED APPLICATIONS

This application claims priority under 35 U.S.C. §120 as a continuation of U.S. patent application Ser. No. 10/867,923, filed on Jun. 14, 2004, now U.S. Pat. No. 7,155,446, which application lists as inventors Thierry Cruanes, Wei Li, Ari Mozes and Benoit Dagville, which application is titled PERFORMING RECURSIVE DATABASE OPERATIONS, and which application claims domestic priority to provisional U.S. Patent Application Ser. No. 60/571,441, entitled PERFORMING RECURSIVE DATABASE OPERATIONS, filed May 14, 2004; the contents of both of which applications are hereby incorporated by reference in their entirety for all purposes. This application is also related to the following U.S. patent applications: Ser. No. 10/643,629, entitled FREQUENT ITEMSET COUNTING USING CLUSTERED PREFIXES AND INDEX SUPPORT, filed on Aug. 18, 2003; Ser. No. 10/643,563, entitled DYNAMIC SELECTION OF FREQUENT ITEMSET COUNTING TECHNIQUE, filed on Aug. 18, 2003; and Ser. No. 10/643,628, entitled EXPRESSING FREQUENT ITEMSET COUNTING OPERATIONS, filed on Aug. 18, 2003; the contents of each of which are hereby incorporated by reference in their entirety for all purposes.

FIELD OF THE INVENTION

The present invention relates to databases, and in particular, to performing recursive database operations.

BACKGROUND

Some computational tasks are especially suitable for recursive processing. One example of an operational task that lends itself especially well to recursive processing is "frequent itemset" determination. An "itemset" is a set of items. For example, one itemset might include the items (apple, banana), while another itemset might include the items (apple, orange), while yet another itemset might include the items (banana, orange). An itemset is "frequent", relative to a set of data structures, if the number of the data structures that contain all of the items in the itemset is at least a specified fraction of the total number of the data structures in the set.

For example, in a set of three data structures, each data structure might represent a different customer's transaction at a supermarket. A first data structure might contain the items (apple, banana, milk), while a second data structure might contain the items (apple, banana, milk, orange), while a third data structure might contain the item (orange). Assuming that the specified fraction is ⅔, the itemset (apple, banana) is a frequent itemset because "apple" occurs with "banana" in two of the three data structures, but the itemsets (apple, orange) and (banana, orange) are not frequent itemsets because "apple" occurs with "orange" in only one of the three data structures and "banana" occurs with "orange" in only one of the three data structures. As the number of data structures in a set of data structures increases, the determination of whether a particular itemset is frequent relative to that set of data structures becomes more computationally intensive.

Frequent itemset determination lends itself especially well to recursive processing due at least in part to the observation that an N-element itemset cannot be a frequent itemset relative to a set of data structures unless all of the (N−1)-element subsets of the N-element itemset are also frequent itemsets relative to that set of data structures. For example, the 3-element itemset (apple, banana, milk) cannot be a frequent itemset relative to the set of data structures in the above example unless all of the 2-element subsets of that 3-element itemset, namely, (apple, banana), (apple, milk), and (banana, milk), are also frequent itemsets relative to the set of data structures in the above example.

This observation allows the computationally intensive determination of whether itemsets are frequent to be performed for fewer itemsets. The determination of whether a particular N-element itemset is frequent needs to be performed only if all of the (N−1)-element subsets of the particular N-element itemset are also frequent. Thus, for each successive value of N, the group of N-element itemsets for which this determination needs to be performed can be based on the determinations already performed for the (N−1)-element itemsets. Frequent itemset counting is, therefore, a task that can be performed more efficiently using a recursive approach.

According to one theoretical approach, frequent itemsets might be determined in the following manner. An application that is external to a database server might send a query to the database server. When executed, the query would cause the database server to select, from a set of data structures, each data structure that contains all of the items in a specified itemset. The database server would execute the query and return the selected data structures to the application. The application might count the selected data structures and determine whether the number of selected data structures meets a specified threshold. If the number of selected data structures met the specified threshold, then the application might place the specified itemset in a set of frequent itemsets. The application might perform the above steps for each 1-element itemset that is a subset of an M-element itemset, one 1-element itemset at a time, and one 1-element itemset after another.

Once the application had performed the above steps for each such 1-element itemset, the application might determine, for each particular 2-element subset of the M-element itemset, whether all of the 1-element subsets of that particular 2-element subset are contained in the set of frequent itemsets. If all of the 1-element subsets of the particular 2-element subset were contained in the group of frequent itemsets, then the application might send, to the database server, a query that would cause the database server to select, from the set of data structures, each data structure that contains all of the items in the particular 2-element itemset. The database server would execute the query and return the selected data structures to the application. The application might count the selected data structures and determine whether the number of selected data structures meets the specified threshold. If the number of selected data structures met the specified threshold, then the application might place the particular 2-element itemset in the set of frequent itemsets. The application might perform the above steps for each 2-element itemset that is a subset of the M-element itemset, one 2-element itemset at a time, and one 2-element itemset after another.

For each successive value of N, the application might perform the above steps for the N-element itemsets that are subsets of the M-element itemset until N was greater than M or there were no (N−1)-element itemsets in the set of frequent itemsets, whichever came first. Thus, by sending a multitude of queries to a database server in serial manner and counting the results of such queries, the application might determine frequent itemsets that are subsets of the M-element itemset.

Unfortunately, considerable overheard would be involved in the above approach. It would take significant time for the application to send the many queries to the database server and for the database server to send the results of the many queries back to the application.

Furthermore, because most of the operations performed in the above approach would be performed by the application (the database server would just execute queries and return the results), application programmers would be burdened with implementing the functionality required to perform most of the operations involved in the above approach.

These are some of the problems that would attend the above approach. A technique that overcomes these problems is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus is described for performing recursive database operations. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In order to perform recursive database operations more efficiently, according to one embodiment of the invention, a plurality of first-stage slaves and a plurality of second-stage slaves are established in a database server. In a first iteration of a recursive database operation, the first-stage slaves concurrently process data items and send the results of the first-stage slaves' processing to the second-stage slaves. The second-stage slaves receive the first results of the first-stages slaves' processing and concurrently process those first results. The second-stage slaves store the first results of the second-stage slaves' processing in a data repository.

In a second iteration of the recursive database operation, the first-stage slaves obtain the first results of the second-stage slaves' processing from the data repository, concurrently process those first results, and send the second results of the first-stage slaves' processing to the second-stage slaves. The second-stage slaves receive the second results of the first-stages slaves' processing and concurrently process those second results. The second-stage slaves store the second results of the second-stage slaves' processing in the data repository.

Subsequent iterations of the recursive database operation proceed in this manner until the recursive database operation has been completed. In each iteration, the first-stage slaves consume the product of the second-stage slaves' processing during the previous iteration, and the second-stage slaves consume the product of the first-stage slaves' processing during the current iteration.

Because the first-stage slaves and second-stage slaves are implemented in the database server, the above embodiment makes it unnecessary for an application to send multiple queries to and receive multiple results from the database server during the performance of the recursive database operation. Additionally, application programmers are spared the burden of programming applications to perform the processing that is performed by the first-stage slaves and second-stage slaves.

Multi-Slave Database Server

Figure 1:
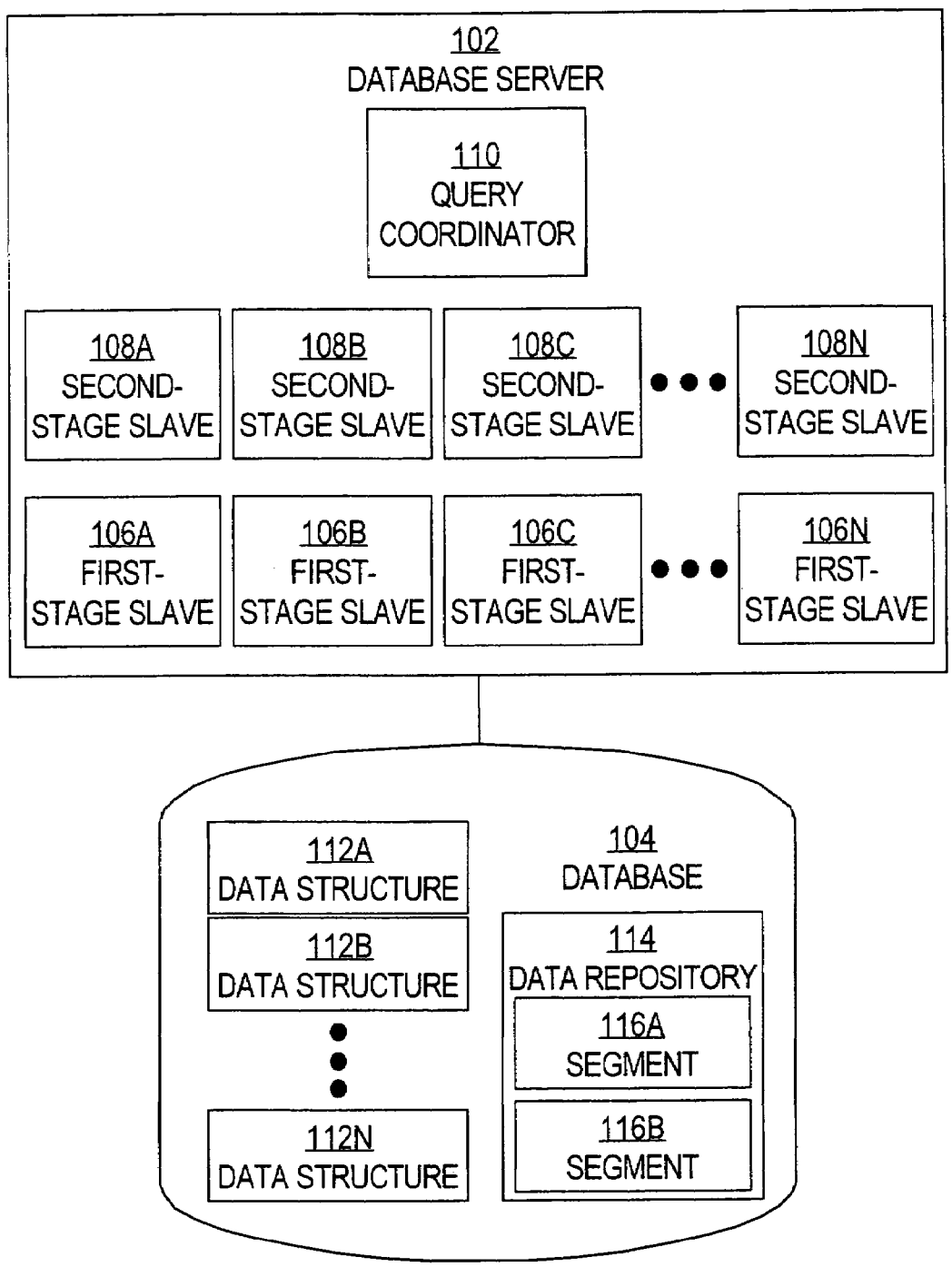
FIG. 1 is a block diagram that illustrates a system in which recursive database operations may be performed in a parallelized manner, according to an embodiment of the present invention.

FIG. 1 is a block diagram that illustrates a system 100 in which recursive database operations may be performed in a parallelized manner, according to an embodiment of the present invention. System 100 comprises a database server 102 and a database 104. Database server 102 is communicatively coupled to database 104.

Database server 102 comprises a plurality of first-stage slaves 106A-N and a plurality of second-stage slaves 108A-N. Each of first-stage slaves 106A-N may be a separate thread of a first process, and each of second-stage slaves 108A-N may be a separate thread of a second process. Alternatively, each of first-stage slaves 106A-N and second-stage slaves 108A-N may be a separate thread of the same process. Alternatively, each of first-stage slaves 106A-N and each of second-stage slaves 108A-N may be a separate process. First-stage slaves 106A-N execute concurrently with each other and each of second-stage slaves 108A-N.

Database server 102 also comprises a query coordinator 110. Query coordinator 110 is a process that executes concurrently with first-stage slaves 106A-N and second-stage slaves 108A-N. Query coordinator 110 sends messages to, and receives messages from, first-stage slaves 106A-N and second-stage slaves 108A-N. Such messages may be sent and received using inter-process communication mechanisms, for example.

Database 104 comprises data structures 112A-N. Each of data structures 112A-N may be, for example, a separate row of a database table. In one embodiment, each of data structures 112A-N contains one or more items. For example, one of data structures 112A-N might contain items such as "apple," "banana," and "orange." Database 104 also comprises a data repository 114. Data repository 114 may be, for example, a temporary database table.

In one embodiment, data repository 114 comprises two separate segments 116A and 116B. One of segments 116A-B is designated as a "read" segment, and one of segments 116A-B is designated as a "write" segment. In one embodiment, query coordinator 110 maintains state information that indicates which of segments 116A-B is currently designated as the "read" segment, and which of segments 116A-B is currently designated as the "write" segment. The designations of segments 116A-B can be swapped.

Dual-Stage Parallelized Performance of Recursive Database Operations

Figure 2:
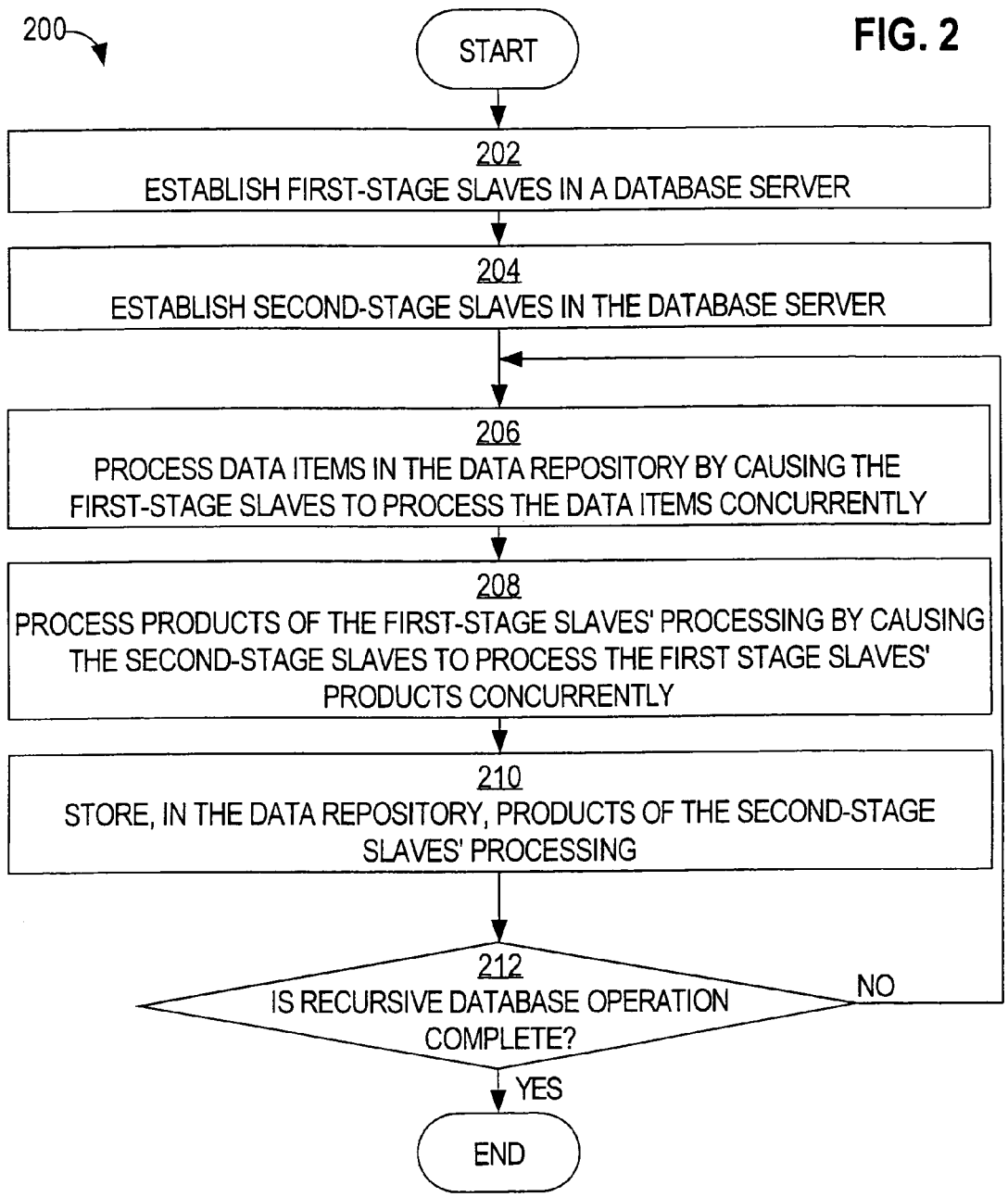
FIG. 2 is a flow diagram that illustrates a technique for performing a recursive database operation using two stages of concurrently executing slaves, according to an embodiment of the present invention.

FIG. 2 is a block diagram that illustrates a technique 200 for performing a recursive database operation using two stages of concurrently executing slaves, according to an embodiment of the present invention. In block 202, a plurality of first-stage slaves is established in a database server. For example, first-stage slaves 106A-N may be established in database server 102. In block 204, a plurality of second-stage slaves in established in the database server. For example, second-stage slaves 108A-N may be established in database server 102.

An iteration of the recursive database operation is represented in blocks 206-212. In block 206, data items in a data repository are processed by causing the first-stage slaves to process concurrently the data items. For example, database server 102 may process a plurality of data items that are stored in data repository 114 by causing first-stage slaves 106A-N to process concurrently the data items. In one embodiment, each data item is a separate itemset.

In block 208, the products of the first-stage slaves' processing are processed by causing the second-stage slaves to process concurrently those products. For example, database server 102 may process the products of the first-stage slaves' earlier processing by causing second-stage slaves 108A-N to process concurrently the first-stage slaves' products.

In block 210, the products of the second-stage slaves' processing are stored in the data repository. For example, each of second-stage slaves 108A-N may store, in data repository 114, data items that are the products of the second-stage slaves' processing.

In block 212, it is determined whether the recursive database operation is complete. For example, query coordinator 110 may determine whether the recursive database operation is complete. If the recursive database operation is complete, then technique 200 ends. Alternative, if the recursive database operation is not complete, then control passes back to block 206.

Thus, if the recursive database operation is not complete, then, during a next iteration of the recursive database operation, the first-stage slaves will, in block 206, process concurrently the products produced by the second-stage slaves during the then-previous iteration of the recursive database operation. These products may be, for example, data items that second-stage slaves 108A-N stored in data repository 114.

Selecting Criteria-Satisfying Data Items

In one embodiment of the invention, at least some of the processing performed by first-stage slaves 106A-N, second-stage slaves 108A-N, or both, involves determining whether data items satisfy specified criteria, and producing only those of the data items that satisfy the specified criteria.

In one embodiment, second-stage slaves 108A-N concurrently process data items produced by the processing of first-stage slaves 106A-N by determining, for each particular data item, whether that particular data item satisfies specified criteria. In one embodiment, second-stage slaves 108A-N select only the data items that satisfy the specified criteria, and store in data repository 114 only the selected data items. In one embodiment, second-stage slaves 108A-N return, to an application or other set of processes or threads, only the selected data items. In one embodiment, because only the selected data items are stored in data repository 114, first-stage slaves 106A-N process only the selected data items during the next iteration of the recursive database operation.

Determining Candidate Itemsets

In one embodiment, the data items processed and produced by first-stage slaves 106A-N and second-stage slaves 108A-N are itemsets. In one embodiment, the processing performed by first-stage slaves 106A-N involves determining candidate itemsets and counting how many of data structures 112A-N contain all of the elements of each such candidate itemset.

As is discussed above, the observation that an N-element itemset cannot be a frequent itemset relative to a set of data structures unless all of the (N−1)-element subsets of the N-element itemset are also frequent itemsets relative to that set of data structures allows the computationally intensive determination of whether itemsets are frequent to be performed for fewer itemsets during each successive iteration of a recursive frequent itemset-determining operation.

Accordingly, in one embodiment, during an iteration of the recursive frequent itemset-determining operation, at least one of first-stage slaves 106A-N does the following. At least one of first stage slaves 106A-N reads (N−1)-element itemsets from data repository 114. The (N−1)-element itemsets are, in one embodiment, frequent (N−1)-element itemsets that second-stage slaves 108A-N stored in data repository 114 during a previous iteration of the operation. At least one of first-stage slaves 106A-N determines all of the different possible N-element itemsets that are subsets of an M-element itemset, where the M-element itemset includes one instance of every item that occurs in data structures 112A-N.

For example, if items (apple, banana, milk, orange) are the only items that occur once or more in data structures 112A-N, then the possible 2-element itemsets of that 4-element itemset are (apple, banana), (apple, milk), (apple, orange), (banana, milk), (banana, orange), and (milk, orange).

In one embodiment, for each such possible N-element subset, at least one of first-stage slaves 106A-N determines whether all of the (N−1)-element subsets of that possible N-element subset are frequent (N−1)-element itemsets that were read from data repository 114. If all of the (N−1)-element subsets of a particular N-element itemset are frequent (N−1) element itemsets, then at least one of first-stage slaves 106A-N places the particular N-element itemset in a group of candidate N-element itemsets. Otherwise, the particular N-element itemset is not placed in the group of candidate N-element itemsets.

For example, if (apple), (banana), and (orange) are the only frequent 1-element itemsets relative to data structures 112A-N, then (apple, banana), (apple, orange), and (banana, orange) might be frequent 2-element itemsets relative to data structures 112A-N, and are therefore candidate 2-element itemsets. However, in this example, (apple, milk), (banana, milk), and (milk, orange) cannot be frequent 2-element itemsets relative to data structures 112A-N because (milk) is not a frequent 1-element itemset relative to data structures 112A-N. Consequently, the determinations of whether (apple, milk), (banana, milk), and (milk, orange) actually are frequent 2-element itemsets relative to data structures 112A-N do not need to be performed.

In one embodiment, during the initial iteration of the operation, first-stage slaves 106A-N do not determine candidate 1-element itemsets based on the contents of data repository 114, because at that point, data repository 114 is empty.

Instead, first-stage slaves 106A-N assume that all of the 1-element subsets of the M-element itemset referenced above are candidate 1-element itemsets.

In one embodiment, only one of first-stage slaves 106A-N determines the group of candidate N-element itemsets as discussed above. In one embodiment, after making this determination, that first-stage slave sends, to the others of first-stage slaves 106A-N, the candidate N-element itemsets.

Concurrently Counting Occurrences of Candidate Itemsets

As is discussed above, in one embodiment, a group of candidate N-element itemsets is generated based on the contents of data repository 114, and the contents of that group are obtained by each of first-stage slaves 106A-N. Once the group of candidate N-element itemsets is known, the occurrences of those candidate N-element itemsets in data structures 112A-N can be counted. Occurrences of non-candidate N-element itemsets do not need to be counted.

In order to count these occurrences more efficiently, in one embodiment, the counting is performed concurrently, or in parallel, by first-stage slaves 106A-N. Each of first-stage slaves 106A-N may be assigned a separate subset of data structures 112A-N. For example, if there were 10 first-stage slaves 106A-N and 100 data structures 112A-N, then each of first-stage slaves 106A-N might be assigned 10 separate data structures of data structures 112A-N. The divvying of data structures 112A-N among first-stage slaves 106A-N might be done according to range, for example, or according to a hash mapping, for another example.

Each of data structures 112A-N may indicate an identifier that is unique to that data structure. A particular data structure's identifier may be used to determine the range in which the particular data structure belongs. Alternatively, a particular data structure's identifier may be used as input to a hash function that produces a hash value to which the particular data structure corresponds. For example, if there were 10 first-stage slaves 106A-N and 100 data structures 112A-N, then the hash function might, for each data structure, divide that data structure's identifier by 10 and take the whole remainder resulting from that division to be the hash value associated with that data structure.

In one embodiment, each of first-stage slaves 106A-N counts, concurrently with each other of first-stage slaves 106A-N, the occurrences of the candidate N-element itemsets in data structures in the subset of data structures 112A-N that has been assigned to that first-stage slave. In one embodiment, because multiple slaves count occurrences of the candidate N-element itemsets in parallel, the time taken to count all such occurrences is reduced.

For example, the contents of data structures 112A-C assigned to first-stage slave 106A might be (apple, banana, milk), (apple, banana, milk, orange), and (orange), respectively, and the contents of data structures 112D-F assigned to first-stage slave 106B might be (banana, milk, orange), (apple, milk, orange), and (apple, banana, orange), respectively. In this example, assuming that the candidate 2-element itemsets are (apple, banana), (apple, milk), (apple, orange), (banana, milk), (banana, orange), and (milk, orange), first-stage slave 106A would count 2 occurrences of (apple, banana), 2 occurrences of (apple, milk), 1 occurrence of (apple, orange), 2 occurrences of (banana, milk), 1 occurrence of (banana, orange), and 1 occurrence of (milk, orange). In this example, assuming the same candidate 2-element itemsets, second-stage slave 106B would count 1 occurrence of (apple, banana), 1 occurrence of (apple, milk), 2 occurrences of (apple, orange), 1 occurrence of (banana, milk), 2 occurrences of (banana, orange), and 2 occurrences of (milk, orange).

In one embodiment, the counting of occurrences of candidate N-element itemsets is performed using either a "bitmap intersection" technique or a "prefix tree counting" technique. Both of these techniques are specifically described in co-pending U.S. patent application Ser. No. 10/643,563, titled "DYNAMIC SELECTION OF FREQUENT ITEMSET COUNTING TECHNIQUE." In one embodiment, the technique that is used to count occurrences of candidate N-element itemsets is dynamically determined at each iteration of the operation. Thus, the counting technique used during one iteration of the operation may differ from the counting technique used during another iteration of the operation. Techniques for dynamically selecting counting techniques also are described in U.S. patent application Ser. No. 10/643,563.

Distributing Preliminary Counts Among Second-Stage Slaves

In one embodiment, each of first-stage slaves 106A-N counts the total number of data structures in the subset of data structures 112A-N assigned to that first-stage slave. In one embodiment, each particular first-stage slave of first-stage slaves 106A-N sends, to one or more of second-stage slaves 108A-N, at least the following type of information: (a) one or more of the candidate N-element itemsets, (b) a count of occurrences of those candidate N-element itemsets in those of data structures 112A-N assigned to the particular first-stage slave, and (c) a count of the total number of those of data structures 112A-N assigned to the particular first-stage slave.

In one embodiment, each of first-stage slaves 106A-N sends the above type of information to multiple second-stage slaves of second-stage slaves 108A-N. In one embodiment, all of the counts associated with a particular candidate N-element itemset are sent to the same second-stage slave, regardless of which first stage-slave determined the counts. However, counts associated with different N-element itemsets may be sent to different second-stage slaves.

For example, assuming the candidate 2-element itemsets of the example above, each of first-stage slaves 106A-N may send counts to various ones of second-stage slaves 108A-N in the following manner: counts associated with (apple, banana) may be sent to second-stage slave 108A, counts associated with (apple, milk) may be sent to second-stage slave 108B, counts associated with (apple, orange) may be sent to second-stage slave 108C, counts associated with (banana, milk) may be sent to second-stage slave 108D, counts associated with (banana, orange) may be sent to second-stage slave 108E, and counts associated with (milk, orange) may be sent to second-stage slave 108F.

For another example, if there are fewer second-stage slaves 108A-N, then counts associated with (apple, banana) and counts associated with (apple, milk) may be sent to second-stage slave 108A, counts associated with (apple, orange) and counts associated with (banana, milk) may be sent to second-stage slave 108B, and counts associated with (banana, orange) and counts associated with (milk, orange) may be sent to second-stage slave 108C.

In one embodiment, the candidate itemsets are divvied among second-stage slaves 108A-N in as balanced a manner as possible, so that each of second-stage slaves 108A-N receives counts associated with approximately the same number of candidate itemsets during a particular iteration of the operation. Candidate itemsets may be divvied among second-stage slaves 108A-N through a hash-mapping technique, for example. For example, the elements of a particular candidate itemset may be enumerated, combined, and input into a hash function. Counts associated with the particular candidate itemset may be sent to the second-stage slave that is associated with the hash value produced by the hash function.

Concurrently Aggregating Preliminary Counts

In one embodiment, the processing performed by second-stage slaves 108A-N involves aggregating preliminary counts received from first-stage slaves 106A-N, and selecting one or more candidate N-element itemsets based on whether aggregate counts for those itemsets meet a specified threshold.

In one embodiment, due to the techniques described above, each of second-stage slaves 108A-N receives, from first-stage slaves 106A-N, one or more preliminary occurrence counts respectively associated with one or more separate subsets of the candidate N-element itemsets. In one embodiment, each of second-stage slaves 108A-N also receives, from each of first-stage slaves 106A-N that sends a preliminary occurrence count to that second-stage slave, a count of the total number of data structures 112A-N that were assigned to that first-stage slave.

For example, each of first-stage slaves 106A-N might determine, for 10 separate database structures of database structures 112A-N, how many occurrences of each of the candidate 2-element itemsets are within those database structures. Continuing the example, second-stage slave 108A might be associated with candidate 2-element itemsets (apple, banana) and (apple, milk). Therefore, in this example, each particular first-stage slave of first-stage slaves 106A-N sends, to second-stage slave 108A, information that indicates: the number of database structures that the particular first-stage slave evaluated (in this case, 10), the number of occurrences of (apple, banana) in the database structures that the particular first-stage slave evaluated, and the number of occurrences of (apple, milk) in the database structures that the particular first-stage slave evaluated.

In one embodiment, each particular second-stage slave of second-stage slaves 108A-N separately aggregates (i.e., adds up), for each of the candidate N-element itemsets with which the particular second-stage slave is associated, the preliminary counts that the particular second-stage slave receives from first-stage slaves 106A-N. For example, second-stage slave 108A might receive, from first-stage slave 106A, a count of 2 for (apple, banana) and a count of 2 for (apple, milk). Continuing the example, second-stage slave 108A might receive, from first-stage slave 106B, a count of 1 for (apple, banana) and a count of 1 for (apple, milk). Therefore, in this example, second-stage slave 108A would determine an aggregate count of 3 for (apple, banana) and an aggregate count of 3 for (apple, milk).

In one embodiment, second-stage slaves 108A-N concurrently determine aggregate counts for candidate N-element itemsets. For example, second-stage slave 108A may aggregate counts for (apple, banana) and (apple, milk) at the same time that second-stage slave 108B aggregates counts for (apple, orange) and (banana, milk), and at the same time that second-stage slave 108C aggregates counts for (banana, orange) and (milk, orange).

In one embodiment, second-stage slaves 108A-N aggregate counts concurrently with first-stage slaves 106A-N determining the counts and sending the counts to second-stage slaves 108A-N.

Selecting Frequent Itemsets from Among Candidate Itemsets

As is described above, each of second-stage slaves 108A-N receive, from each of first-stage slaves 106A-N that sends a preliminary occurrence count to that second-stage slave, a count of the total number of data structures 112A-N that were assigned to that first-stage slave. In one embodiment, each of second-stage slaves aggregates each such total number of data structures to determine an aggregate total number of data structures 112A-N.

In one embodiment, once a particular second-stage slave of second-stage slaves 108A-N has determined an aggregate count for a particular candidate N-element itemset, as described above, the particular second-stage slave determines whether the aggregate count for the particular candidate N-element itemset is at least as great as a specified fraction of the aggregate total number of data structures 112A-N. The specified fraction is referred to herein as the "threshold." If the aggregate count for the particular candidate N-element itemset is at least as great as the number derived from the specified threshold, then the particular second-stage slave determines that the particular candidate N-element is a frequent N-element itemset relative to data structures 112A-N.

For example, second-stage slave 108A might receive, from first-stage slave 106A, an indication that first-stage slave 106A evaluated 3 of database structures 112A-N. Continuing the example, second-stage slave 108A might receive, from first-stage slave 106B, an indication that first-stage slave 106B evaluated 3 of database structures 112A-N. Assuming for purposes of example that these were the only "database structure totals" received from first-stage slaves 106A-B, second-stage slave 108A determines that the aggregate total number of data structures 112A-N is 6 (i.e., 3+3).

Continuing the example, if the aggregate count for (apple, banana) is 3, then second-stage slave 108A determines that the fraction of data structures 112A-N that contain (apple, banana) is ½ (i.e., 3/6). Continuing the example, if the aggregate count for (apple, milk) is 3, then second-stage slave 108A determines that the fraction of data structures 112A-N that contain (apple, milk) is also ½ (i.e., 3/6). Assuming for purposes of the example that the specified threshold is ⅓, second-stage slave 108A determines that both (apple, banana) and (apple, milk) are frequent 2-element itemsets relative to data structures 112A-N.

In one embodiment, each of second-stage slaves 108A-N determines, for each of the candidate N-element itemsets with which that second-stage slave is associated, whether that candidate N-element itemset is a frequent N-element itemset relative to data structures 112A-N. In one embodiment, each of second-stage slaves 108A-N selects, from among the candidate N-element itemsets with which that second-stage slave is associated, only the frequent N-element itemsets.

In one embodiment, for a particular iteration of the operation, each of second-stage slaves 108A-N stores, in data repository 114, only the selected frequent N-element itemsets. In one embodiment, each of second-stage slaves 108A-N sends, to one or more other entities that may include an application external to database server 102, the selected frequent N-element itemsets. In one embodiment, each of second-stage slaves 108A-N performs the above determination, selection, storage, and sending concurrently with each of the others of second-stage slaves 108A-N.

In one embodiment, one or more of first-stage slaves 106A-N uses the frequent N-element itemsets stored in data repository 114 to determine candidate (N+1)-element itemsets during a next iteration of the operation. Thus, the determinations of each successive iteration may be based upon the determinations of previous iterations.

Flow Control

In one embodiment, each particular first-stage slave of first-stage slaves 106A-N sends, to second-stage slaves 108A-N, a message that indicates that the particular first-stage slave has finished evaluating the subset of database structures 112A-N to which the particular first-stage slave was assigned. A particular first-stage slave sends the message only after the particular first-stage slave has evaluated all of the database structures in the particular first-stage slave's assigned subset of data structures. In one embodiment, each of first-stage slaves 106A-N waits, after sending such a message, to receive a signal from query coordinator 110 before proceeding to the next iteration of the operation.

In one embodiment, when a particular second-stage slave of second-stage slaves 108A-N has received such a message from each of first-stage slaves 106A-N, the particular second-stage slave begins to determine, based on the aggregated counts and database structure total, which of the candidate N-element itemsets are frequent N-element itemsets. In one embodiment, second-stage slaves 108A-N do not begin to perform this determination until such a message has been received from each of first-stage slaves 106A-N.

In one embodiment, for each particular second-stage slave of second-stage slaves 108A-N, when the particular second-stage slave has finished storing frequent N-element itemsets in data repository 114, the particular second-stage slave sends a message to query coordinator 110. The message indicates to query coordinator 110 that the particular second-stage slave has finished. In one embodiment, second-stage slaves 108A-N store frequent N-element itemsets in a particular segment of segments 116A-B that has been designated as the "write" segment.

In one embodiment, after query coordinator 110 has received a message from each of second-stage slaves 108A-N indicating that those second-stage slaves have finished, query coordinator 110 swaps the designations of the "read" and "write" segments 116A-B, so that the former "read" segment becomes the new "write" segment for the next iteration of the operation, and the former "write" segment becomes the new "read" segment for the next iteration of the operation. After the designations have been swapped, the newly designated "write" segment may be emptied.

In one embodiment, after query coordinator 110 swaps the designations of the "read" and "write" segments, query coordinator 110 sends, to second-stage slaves 108A-N, a reference to the newly designated "write" segment. In one embodiment, when second-stage slaves 108A-N store frequent N-element itemsets in the "write" segment, second-stage slaves 108A-N do so by writing the frequent N-element itemsets to a location based on the reference to the "write" segment.

In one embodiment, after query coordinator 110 swaps the designations of the "read" and "write" segments, query coordinator 110 sends, to first-stage slaves 106A-N, a reference to the newly designated "read" segment, which contains the frequent itemsets stored during the previous iteration of the operation. In one embodiment, one or more of first-stage slaves 106A-N generates candidate (N+1)-element itemsets based on frequent N-element itemsets read from a location based on the reference to the "read" segment.

In one embodiment, after sending the newly designated "read" segment reference to each of first-stage slaves 106A-N as described above, query coordinator 110 sends, to each of first-stage slaves 106A-N, a signal that informs first-stage slaves 106A-N that first-stage slaves 106A-N may proceed with the next iteration of the operation. In one embodiment, query coordinator 110 then waits to receive "finished" messages from each of second-stage slaves 108A-N as described above.

In one embodiment, after at least one of first-stage slaves 106A-N has received a signal from query coordinator 110 that first-stage slaves 106A-N may proceed with the next iteration of the operation, that first-stage slave (or slaves) determines (a) whether the currently designated "write" segment of segments 116A-B is empty and (b) whether "N" is greater than "M" as used in the above context of N-element itemsets and the M-element itemset. In one embodiment, if the currently designated "write" segment is empty (meaning that there are no candidate (N+1)-element itemsets for the next iteration of the operation), or if "N" is greater than "M," then the recursive operation is ended. Otherwise, "N" is incremented and the next iteration of the recursive is performed as described above.

Hardware Overview

Figure 3:
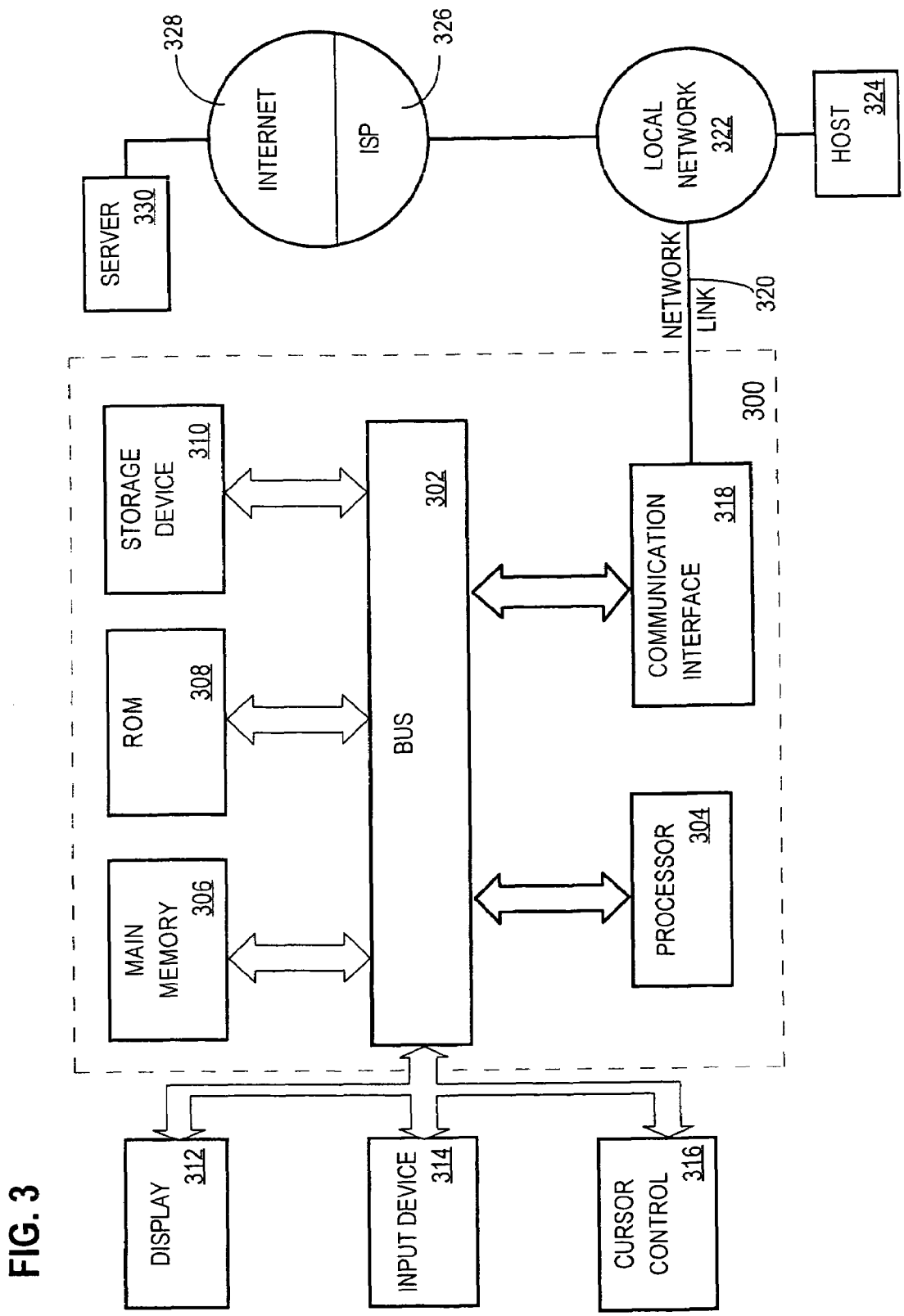
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
during a first iteration of a multi-iteration operation performed by a first set of slaves and a second set of slaves, generating results of operations performed by the second set of slaves;
during each iteration of two or more iterations of the multi-iteration operation, the two or more iterations occurring after the first iteration of the multi-iteration operation, (a) providing, to the first set of slaves, results of operations performed by the second set of slaves during a previous iteration of the multi-iteration operation, and (b) providing, to the second set of slaves, results of operations performed by the first set of slaves during the current iteration of the multi-iteration operation;
wherein the operations performed by the first set of slaves are first operations for counting occurrences of itemsets in each of a plurality of data subsets;
wherein the operations performed by the second set of slaves are second operations for identifying which of said itemsets occur above a threshold frequency within the plurality of data subsets;
wherein each slave in the second set of slaves performs the second operations for a different subset of said itemsets;
wherein each slave in the first set of slaves and the second set of slaves is a process or thread executed by one or more processors in a database system;
wherein each iteration of the multi-iteration operation is performed by one or more computing devices.

2. The method of claim 1, wherein:
the first set of slaves executes concurrently with the second set of slaves;
at least some of the operations performed by the first set of slaves are performed during a same time that at least some of the operations performed by the second set of slaves are performed;

during each particular iteration of the two or more iterations:
- (a) operations performed by the second set of slaves during said particular iteration are operations that the second set of slaves performs on results of operations performed by the first set of slaves during the particular iteration; and
- (b) operations performed by the first set of slaves during said particular iteration are operations that the first set of slaves performs on results of operations performed by the second set of slaves during said iteration previous to said particular iteration.

3. The method of claim 1, wherein, during each iteration of the two or more iterations, the first set of slaves reads, from a repository common to each of the first set of slaves, results that were (a) results of operations performed by the second set of slaves during the previous iteration of the multi-iteration operation, and (b) stored in the repository by the second set of slaves during the previous iteration of the multi-iteration operation.

4. The method of claim 1, further comprising:
during a first iteration of the multi-iteration operation, determining candidate N-element sets based on (N−1)-element sets stored in a data repository.

5. The method of claim 4, wherein determining the candidate N-element sets comprises:
determining possible N-element sets that are subsets of an M-element set; and
for each particular possible N-element set of the possible N-element sets, performing steps comprising:
determining whether all (N−1)-element subsets of the particular possible N-element set are stored in the data repository; and
including the particular possible N-element set in the candidate N-element sets only if all (N−1)-element subsets of the particular possible N-element set are stored in the data repository.

6. The method of claim 4, further comprising:
assigning a first subset of a set of data structures to a first first-stage slave of the first set of slaves, wherein each data structure in the set of data structures comprises a separate set of elements;
assigning a second subset of the set of data structures to a second first-stage slave of the first set of slaves;
causing the first first-stage slave to perform first steps; and
causing the second first-stage slave to perform second steps;
wherein the first steps comprise determining, for each particular candidate N-element set of the candidate N-element sets, how many data structures in the first subset contain all of the elements of the particular candidate N-element set; and
wherein the second steps comprise determining, for each particular candidate N-element set of the candidate N-element sets, how many data structures in the second subset contain all of the elements of the particular candidate N-element set;
wherein the first steps and the second steps are performed concurrently.

7. The method of claim 6, wherein the first steps further comprise:
for each particular candidate N-element set of the candidate N-element sets, determining a separate hash value that corresponds to the particular candidate N-element set; and
for each particular candidate N-element set of the candidate N-element sets, (a) selecting, from among the second set of slaves, a second-stage slave that corresponds to the separate hash value that corresponds to the particular candidate N-element set, and (b) sending, to said second-stage slave, separate count information that includes an indication of how many data structures in the first subset contain all of the elements of the particular candidate N-element set.

8. The method of claim 4, further comprising
causing a first second-stage slave of the second set of slaves to perform first steps; and
causing a second second-stage slave of the second set of slaves to perform second steps;
wherein the first steps and the second steps are performed concurrently;
wherein the first steps comprise:
receiving, from a first first-stage slave of the first set of slaves, first count information for a first candidate N-element set of the candidate N-element sets;
receiving, from a second first-stage slave of the first set of slaves, second count information for the first candidate N-element set, wherein the second first-stage slave is separate from the first first-stage slave;
determining a first sum of at least the first count information for the first candidate N-element set and the second count information for the first candidate N-element set;
determining whether the first sum satisfies a specified threshold; and
including the first candidate N-element set in the second processed data items only if the first sum satisfies the specified threshold; and
wherein the second steps comprise:
receiving, from the first first-stage slave, first count information for a second candidate N-element set of the candidate N-element sets, wherein the second candidate N-element set differs from the first candidate N-element set;
receiving, from the second first-stage slave, second count information for the second candidate N-element set;
determining a second sum of at least the first count information for the second candidate N-element set and the second count information for the second candidate N-element set;
determining whether the second sum satisfies the specified threshold; and
including the second candidate N-element set in the second processed data items only if the second sum satisfies the specified threshold.

9. The method of claim 8, further comprising:
during a second iteration of the multi-iteration operation, determining candidate (N+1)-element sets based at least in part on N-element sets stored in the data repository.

10. The method of claim 9, wherein determining the candidate (N+1)-element sets comprises:
determining possible (N+1)-element sets that are subsets of the M-element set; and
for each particular possible (N+1)-element set of the possible (N+1)-element sets, performing steps comprising:
determining whether all N-element subsets of the particular possible (N+1)-element set are stored in the data repository; and
including the particular possible (N+1)-element set in the candidate (N+1)-element sets only if all N-element subsets of the particular possible (N+1)-element set are stored in the data repository.

11. The method of claim 9, further comprising:
causing the first first-stage slave to perform third steps; and
causing the second first-stage slave to perform fourth steps;

wherein the third steps and the fourth steps are performed concurrently;
wherein the third steps comprise determining, for each particular candidate (N+1)-element set of the candidate (N+1)-element sets, how many data structures in the first subset contain all of the elements of the particular candidate (N+1)-element set; and
wherein the fourth steps comprise determining, for each particular candidate (N+1)-element set of the candidate (N+1)-element sets, how many data structures in the second subset contain all of the elements of the particular candidate (N+1)-element set.

12. The method of claim 9, further comprising:
causing the first second-stage slave to perform third steps; and
causing the second second-stage slave to perform fourth steps;
wherein the third steps and the fourth steps are performed concurrently;
wherein the third steps comprise:
receiving, from the first first-stage slave, first count information for a first candidate (N+1)-element set of the candidate (N+1)-element sets;
receiving, from the second first-stage slave, second count information for the first candidate (N+1)-element set;
determining a third sum of at least the first count information for the first candidate (N+1)-element set and the second count information for the first candidate (N+1)-element set;
determining whether the third sum satisfies the specified threshold; and
including the first candidate (N+1)-element set in the fourth processed data items only if the third sum satisfies the specified threshold; and
wherein the fourth steps comprise:
receiving, from the first first-stage slave, first count information for a second candidate (N+1)-element set of the candidate (N+1)-element sets, wherein the second candidate (N+1)-element set differs from the first candidate (N+1)-element set;
receiving, from the second first-stage slave, second count information for the second candidate (N+1)-element set;
determining a fourth sum of at least the first count information for the second candidate (N+1)-element set and the second count information for the second candidate (N+1)-element set;
determining whether the fourth sum satisfies the specified threshold; and
including the second candidate (N+1)-element set in the fourth processed data items only if the fourth sum satisfies the specified threshold.

13. One or more computer-readable storage media storing one or more sequences of instructions which, when executed by one or more processors, causes:
during a first iteration of a multi-iteration operation, generating results of operations performed by a second set of slaves;
during each iteration of two or more iterations of the multi-iteration operation, the two or more iterations occurring after the first iteration of the multi-iteration operation, (a) providing, to a first set of slaves, results of operations performed by a second set of slaves during a previous iteration of the multi-iteration operation, and (b) providing, to the second set of slaves, results of operations performed by the first set of slaves during the current iteration of the multi-iteration operation;
wherein the operations performed by the first set of slaves include first operations for counting occurrences of itemsets in each of a plurality of data subsets;
wherein the operations performed by the second set of slaves include second operations for identifying which of said itemsets occur above a threshold frequency within the plurality of data subsets;
wherein each slave in the second set of slaves performs the second operations for a different subset of said itemsets;
wherein each slave in the first set of slaves and the second set of slaves is a process or thread executed by one or more processors in a database system.

14. The one or more computer-readable storage media of claim 13, wherein:
the first set of slaves executes concurrently with the second set of slaves;
at least some of the operations performed by the first set of slaves are performed during a same time that at least some of the operations performed by the second set of slaves are performed;
during each particular iteration of the two or more iterations;
(a) operations performed by the second set of slaves during said particular iteration are operations that the second set of slaves performs on results of operations performed by the first set of slaves during the particular iteration; and
(b) operations performed by the first set of slaves during said particular iteration are operations that the first set of slaves performs on results of operations performed by the second set of slaves during said iteration previous to said particular iteration.

15. The one or more computer-readable storage media of claim 13, wherein during each iteration of the two or more iterations, the first set of slaves reads, from a repository common to each of the first set of slaves, results that were (a) results of operations performed by the second set of slaves during the previous iteration of the multi-iteration operation, and (b) stored in the repository by the second set of slaves during the previous iteration of the multi-iteration operation.

16. The one or more computer-readable storage media of claim 13, wherein the one or more sequences of instructions, when executed by the one or more processors, further causes;
during a first iteration of the multi-iteration operation, determining candidate N-element sets based on (N−1)-element sets stored in a data repository.

17. The one or more computer-readable storage media of claim 16, wherein determining the candidate N-element sets comprises:
determining possible N-element sets that are subsets of an M-element set; and
for each particular possible N-element set of the possible N-element sets, performing steps comprising:
determining whether all (N−1)-element subsets of the particular possible N-element set are stored in the data repository; and
including the particular possible N-element set in the candidate N-element sets only if all (N−1)-element subsets of the particular possible N-element set are stored in the data repository.

18. The one or more computer-readable storage media of claim 16, wherein the one or more sequences of instructions, when executed by the one or more processors, further causes;
assigning a first subset of a set of data structures to a first first-stage slave of the first set of slaves, wherein each data structure in the set of data structures comprises a separate set of elements;

assigning a second subset of the set of data structures to a second first-stage slave of the first set of slaves;
causing the first first-stage slave to perform first steps; and
causing the second first-stage slave to perform second steps;
wherein the first steps comprise determining, for each particular candidate N-element set of the candidate N-element sets, how many data structures in the first subset contain all of the elements of the particular candidate N-element set; and
wherein the second steps comprise determining, for each particular candidate N-element set of the candidate N-element sets, how many data structures in the second subset contain all of the elements of the particular candidate N-element set;
wherein the first steps and the second steps are performed concurrently.

19. The one or more computer-readable storage media of claim 18, wherein the first steps further comprise:
for each particular candidate N-element set of the candidate N-element sets, determining a separate hash value that corresponds to the particular candidate N-element set; and
for each particular candidate N-element set of the candidate N-element sets, (a) selecting, from among the second set of slaves, a second-stage slave that corresponds to the separate hash value that corresponds to the particular candidate N-element set, and (b) sending, to said second-stage slave, separate count information that includes an indication of how many data structures in the first subset contain all of the elements of the particular candidate N-element set.

20. The one or more computer-readable storage media of claim 16, wherein the one or more sequences of instructions, when executed by the one or more processors, further causes;
causing a first second-stage slave of the second set of slaves to perform first steps; and
causing a second second-stage slave of the second set of slaves to perform second steps;
wherein the first steps and the second steps are performed concurrently;
wherein the first steps comprise:
receiving, from a first first-stage slave of the first set of slaves, first count information for a first candidate N-element set of the candidate N-element sets;
receiving, from a second first-stage slave of the first set of slaves, second count information for the first candidate N-element set, wherein the second first-stage slave is separate from the first first-stage slave;
determining a first sum of at least the first count information for the first candidate N-element set and the second count information for the first candidate N-element set;
determining whether the first sum satisfies a specified threshold; and
including the first candidate N-element set in the second processed data items only if the first sum satisfies the specified threshold; and
wherein the second steps comprise:
receiving, from the first first-stage slave, first count information for a second candidate N-element set of the candidate N-element sets, wherein the second candidate N-element set differs from the first candidate N-element set;
receiving, from the second first-stage slave, second count information for the second candidate N-element set;
determining a second sum of at least the first count information for the second candidate N-element set and the second count information for the second candidate N-element set;
determining whether the second sum satisfies the specified threshold; and
including the second candidate N-element set in the second processed data items only if the second sum satisfies the specified threshold.

21. The one or more computer-readable storage media of claim 20, wherein the one or more sequences of instructions, when executed by the one or more processors, further causes;
during a second iteration of the multi-iteration operation, determining candidate (N+1)-element sets based at least in part on N-element sets stored in the data repository.

22. The one or more computer-readable storage media of claim 21, wherein determining the candidate (N+1)-element sets comprises:
determining possible (N+1)-element sets that are subsets of the M-element set; and
for each particular possible (N+1)-element set of the possible (N+1)-element sets, performing steps comprising:
determining whether all N-element subsets of the particular possible (N+1)-element set are stored in the data repository; and
including the particular possible (N+1)-element set in the candidate (N+1)-element sets only if all N-element subsets of the particular possible (N+1)-element set are stored in the data repository.

23. The one or more computer-readable storage media of claim 21, wherein the one or more sequences of instructions, when executed by the one or more processors, further causes;
causing the first first-stage slave to perform third steps; and
causing the second first-stage slave to perform fourth steps;
wherein the third steps and the fourth steps are performed concurrently;
wherein the third steps comprise determining, for each particular candidate (N+1)-element set of the candidate (N+1)-element sets, how many data structures in the first subset contain all of the elements of the particular candidate (N+1)-element set; and
wherein the fourth steps comprise determining, for each particular candidate (N+1)-element set of the candidate (N+1)-element sets, how many data structures in the second subset contain all of the elements of the particular candidate (N+1)-element set.

24. The one or more computer-readable storage media of claim 21, wherein the one or more sequences of instructions, when executed by the one or more processors, further causes;
causing the first second-stage slave to perform third steps; and
causing the second second-stage slave to perform fourth steps;
wherein the third steps and the fourth steps are performed concurrently;
wherein the third steps comprise:
receiving, from the first first-stage slave, first count information for a first candidate (N+1)-element set of the candidate (N+1)-element sets;
receiving, from the second first-stage slave, second count information for the first candidate (N+1)-element set;
determining a third sum of at least the first count information for the first candidate (N+1)-element set and the second count information for the first candidate (N+1)-element set;
determining whether the third sum satisfies the specified threshold; and including the first candidate (N+1)-element set in the fourth processed data items only if the third sum satisfies the specified threshold; and
wherein the fourth steps comprise:
receiving, from the first first-stage slave, first count information for a second candidate (N+1)-element set of the candidate (N+1)-element sets, wherein the second candidate (N+1)-element set differs from the first candidate (N+1)-element set;
receiving, from the second first-stage slave, second count information for the second candidate (N+1)-element set;
determining a fourth sum of at least the first count information for the second candidate (N+1)-element set and the second count information for the second candidate (N+1)-element set;
determining whether the fourth sum satisfies the specified threshold; and
including the second candidate (N+1)-element set in the fourth processed data items only if the fourth sum satisfies the specified threshold.

25. A database system comprising:
one or more processors;
a database;
a first set of slaves and a second set of slaves executing on the one or more processors,
wherein the first set of slaves is different than the second set of slaves;
wherein the one or more processors are configured to:
during a first iteration of a multi-iteration operation performed by the first set of slaves and the second set of slaves, generate results of operations performed by the second set of slaves;
during each iteration of two or more iterations of the multi-iteration operation, the two or more iterations occurring after the first iteration of the multi-iteration operation, (a) provide, to the first set of slaves, results of operations performed by the second set of slaves during a previous iteration of the multi-iteration operation, and (b) provide, to the second set of slaves, results of operations performed by the first set of slaves during the current iteration of the multi-iteration operation;
wherein the operations performed by the first set of slaves are first operations for counting occurrences of itemsets in each of a plurality of data subsets;
wherein the operations performed by the second set of slaves are second operations for identifying which of said itemsets occur above a threshold frequency within the plurality of data subsets;
wherein each slave in the second set of slaves performs the second operations for a different subset of said itemsets;
wherein each slave in the first set of slaves and the second set of slaves is a process or thread executed by the one or more processors.

26. The system of claim 25, wherein:
for each of the candidate itemsets, each first slave of the first set of slaves is configured to send a count of occurrences to only a second slave in the second set of slaves that is associated with the candidate itemset, wherein the count of occurrences is a count of occurrences of the candidate itemset in a subset of data assigned to the second slave.

27. A method for performing a multiple-iteration operation for identifying frequent itemsets in a database, the method comprising:
storing, in a first segment of data, a first set of frequent itemsets discovered during a first iteration of the multi-iteration operation;
storing, in a second segment of data, a second set of frequent itemsets discovered during a second iteration of the multiple-iteration operation;
storing a designation indicating that the second segment is readable for a third iteration of the multiple-iteration operation;
based on the designation, determining to utilize the data in the second segment as input during the third iteration;
based on the designation, determining to output results of the third iteration to the first segment;
replacing the data in the first segment with a third set of frequent itemsets discovered during the third iteration;
modifying the designation to indicate that the first segment is readable for a fourth iteration of the multiple-iteration operation;
based on the designation, determining to utilize the data in the first segment as input during the fourth iteration;
based on the designation, determining to output results of the fourth iteration to the second segment;
replacing the data in the second segment with a fourth set of frequent itemsets discovered during the fourth iteration;
wherein each iteration of the multiple-iteration operation is performed by one or more computing devices.

28. One or more computer-readable storage media storing one or more sequences of instructions which, when executed by one or more processors, causes;
storing, in a first segment of data, a first set of frequent itemsets discovered during a first iteration of the multi-iteration operation;
storing, in a second segment of data, a second set of frequent itemsets discovered during a second iteration of the multiple-iteration operation;
storing a designation indicating that the second segment is readable for a third iteration of the multiple-iteration operation;
based on the designation, determining to utilize the data in the second segment as input during the third iteration;
based on the designation, determining to output results of the third iteration to the first segment;
replacing the data in the first segment with a third set of frequent itemsets discovered during the third iteration;
modifying the designation to indicate that the first segment is readable for a fourth iteration of the multiple-iteration operation;
based on the designation, determining to utilize the data in the first segment as input during the fourth iteration;
based on the designation, determining to output results of the fourth iteration to the second segment;
replacing the data in the second segment with a fourth set of frequent itemsets discovered during the fourth iteration;
wherein each iteration of the multiple-iteration operation is performed by one or more computing devices.

* * * * *

UNITED STATES PATENT AND TRADEMARK OFFICE
CERTIFICATE OF CORRECTION

PATENT NO. : 7,698,312 B2
APPLICATION NO. : 11/600272
DATED : April 13, 2010
INVENTOR(S) : Thierry Cruanes et al.

It is certified that error appears in the above-identified patent and that said Letters Patent is hereby corrected as shown below:

In column 1, line 11, delete "Dagville," and insert -- Dageville, --, therefor.

In column 18, line 3, in Claim 13, delete "subsets:" and insert -- subsets; --, therefor.

In column 18, line 21-22, in Claim 14, delete "iterations;" and insert -- iterations: --, therefor.

In column 18, line 43, in Claim 16, delete "causes;" and insert -- causes: --, therefor.

In column 18, line 63, in Claim 18, delete "causes;" and insert -- causes: --, therefor.

In column 19, line 36, in Claim 20, delete "causes;" and insert -- causes: --, therefor.

In column 20, line 12, in Claim 21, delete "causes;" and insert -- causes: --, therefor.

In column 20, line 32, in Claim 23, delete "causes;" and insert -- causes: --, therefor.

In column 20, line 49, in Claim 24, delete "causes;" and insert -- causes: --, therefor.

In column 22, line 32, in Claim 28, delete "causes;" and insert -- causes: --, therefor.

Signed and Sealed this
First Day of March, 2011

David J. Kappos
*Director of the United States Patent and Trademark Office*